United States Patent
Madanahally Ramakrishna et al.

(10) Patent No.: US 12,335,004 B2
(45) Date of Patent: Jun. 17, 2025

(54) SOUNDING REFERENCE SIGNAL BEAMFORMER ENHANCEMENT WITH TIMING CORRECTION

(71) Applicant: Rakuten Symphony, Inc., Tokyo (JP)

(72) Inventors: Raghavendra Madanahally Ramakrishna, Bangalore (IN); Ronak Bharatkumar Lalwala, Bangalore (IN); Venkatesh Hampasandra Muralidhara, Bangalore (IN); Anurag Gupta, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/276,719

(22) PCT Filed: Nov. 23, 2022

(86) PCT No.: PCT/US2022/050848
§ 371 (c)(1),
(2) Date: Aug. 10, 2023

(87) PCT Pub. No.: WO2024/112333
PCT Pub. Date: May 30, 2024

(65) Prior Publication Data
US 2025/0007578 A1  Jan. 2, 2025

(51) Int. Cl.
*H04B 7/06* (2006.01)
*H04L 5/00* (2006.01)
*H04L 25/02* (2006.01)

(52) U.S. Cl.
CPC ......... *H04B 7/0617* (2013.01); *H04L 5/0051* (2013.01); *H04L 25/0226* (2013.01)

(58) Field of Classification Search
CPC .. H04B 7/0617; H04L 5/0051; H04L 25/0226
See application file for complete search history.

(56) References Cited

U.S. PATENT DOCUMENTS

| | | | |
|---|---|---|---|
| 7,916,081 B2 * | 3/2011 | Lakkis | H04B 7/0417 342/367 |
| 11,777,585 B2 * | 10/2023 | Doi | H04B 7/086 375/267 |
| 2016/0105870 A1 * | 4/2016 | Won | H04B 7/0617 370/330 |
| 2018/0310283 A1 | 10/2018 | Deenoo et al. | |
| 2022/0124560 A1 | 4/2022 | Yeh et al. | |
| 2022/0329289 A1 * | 10/2022 | Huang | H04B 7/0456 |

(Continued)

*Primary Examiner* — Jean B Corrielus
(74) *Attorney, Agent, or Firm* — Sughrue Mion, PLLC

(57) ABSTRACT

A method of estimating beamforming weights, the method including receiving a Sounding Reference Signal (SRS) at an Open Radio Access Network (O-RAN) Distributed Unit (O-DU); performing channel estimation of the SRS received; computing a time domain response on the SRS channel estimation at a level of granularity as defined by a bandwidth of the SRS; determining a timing offset at the defined level of granularity; compensating for the timing offset at the defined level of granularity; estimating the beamforming weights according to the compensated timing offset; and transmitting the estimated beamforming weights to an O-RAN Radio Unit (O-RU) over a fronthaul interface between the O-DU and the O-RU.

18 Claims, 3 Drawing Sheets

(56) References Cited

U.S. PATENT DOCUMENTS

| | | | |
|---|---|---|---|
| 2023/0155864 A1* | 5/2023 | Abdoli | H04L 25/0204 370/329 |
| 2024/0204840 A1* | 6/2024 | Akoum | H04B 7/0413 |

* cited by examiner

SOUNDING REFERENCE SIGNAL BEAMFORMER ENHANCEMENT WITH TIMING CORRECTION

CROSS-REFERENCE TO RELATED APPLICATION

This application is a national stage application of International Application No. PCT/US2022/050848, filed on Nov. 23, 2022, and designated the U.S., the entire contents of which are herein wholly incorporated by reference.

TECHNICAL FIELD

In some example embodiments, the subject matter herein generally relates to beamforming in wireless communication systems, and more specifically to a Sounding Reference Signal (SRS) beamformer enhancement with timing correction in Open Radio Access Network (O-RAN) communication systems.

BACKGROUND

Beamforming has been introduced with great benefits to overcome several communication challenges, such as enhancing the precision of radio connections, increasing throughput, increasing the number of parallel connections in a given cell area, and saving energy consumption during transmissions. For example, in mmWave transmission, beamforming is particularly beneficial to improving the signal-to-noise ratio (SNR) or signal-to-interference-plus-noise ratio (SINR) through direct targeting of user groups, mainly indoor coverage; further, beamforming also may nullify the interference between user equipment (UE) signals in high-density environments.

In addition, a massive multi-inputs multi-outputs (MIMO) antenna system allows the distributed unit (DU) to control the signal transmission in desired directions by changing gain and phase of the antennas. In time division duplex (TDD), channel reciprocity is used to estimate the direction/channel on uplink (UL) and the same in downlink (DL) for beamforming. 3rd Generation Partnership Project (3GPP) New Radio (NR) provides sounding reference signal (SRS) channel that allows the base station to estimate the uplink channel. SRS channel is a multiplexed channel and different users are scheduled on different subcarriers (COMB), cyclic shifts and bandwidth (BW), to optimize SRS resources. The base station can use the SRS channel estimation to obtain the optimized beamforming weights.

Note that timing advance is a special command (notification) from gNB/eNB to UE that enable UE to adjust its uplink transmission. It helps to ensure that uplink transmissions from all UE are synchronized when received by the base station. However, UE possesses residual timing error even with timing advance (TA) from gNB/eNB due to the granularity of TA command (±8 or 16 Ts, for example). In 5G New Radio (NR), the TA granularity is generally based on some parameters (e.g., subcarrier spacing, cyclic prefix, transmission time interval, etc.) associated with of the uplink carrier. Timing errors occur within the TA granularity cannot be corrected by the TA command. Even with pedestrian mobility, few samples of timing error accumulate over tens of meters of UE movement. The group delay of the multipath fading channels does have the same effect of timing offset. This residual timing offset results in frequency selectivity in the UL channel, causing beamforming weights to change within a resource block (RB).

SRS beamformer allows for efficient MU multiplexing since it captures full channel information. With the O-RAN interface, the beamforming coefficients are transferred at resource block or group of resource blocks granularity to reduce the fronthaul (FH) bandwidth. The fronthaul interface is part of the 5G NR Layer 1 implementation. It performs communication between O-RAN Distributed Unit (O-DU) and O-RAN Radio Unit (O-RU) and consists of multiple hardware and software components. However, in highly frequency selective channels and/or with timing offsets at UE, the beamformer granularity is not sufficient to capture the full channel knowledge and this reduces the beamforming performance.

Existing methods do not address the limitations of beamformer performance due to granularity in channel frequency selectivity. This constraint from the O-RAN interface is not present in and thus not considered by the conventional technology. Therefore, there is a need for a method that overcomes the above noted limitations and constraints in the O-RAN interface.

SUMMARY

In accordance with an embodiment, a method of estimating beamforming weights is provided. The method includes receiving a Sounding Reference Signal (SRS) at an Open Radio Access Network (O-RAN) Distributed Unit (O-DU); performing channel estimation of the SRS received; computing a time domain response on the SRS channel estimation at a level of granularity as defined by a bandwidth of the SRS; determining a timing offset at the defined level of granularity; compensating for the timing offset at the defined level of granularity; estimating the beamforming weights according to the compensated timing offset; and transmitting the estimated beamforming weights to an O-RAN Radio Unit (O-RU) over a fronthaul interface between the O-DU and the O-RU.

In accordance with another embodiment, an Open Radio Access Network (O-RAN) wireless communication system is provided. The system includes an O-RAN Radio Unit (O-RU) configured to receive a Sounding Reference Signal (SRS); and an O-RAN Distributed Unit (O-DU) configured to: perform bidirectional communication with the O-RU via a fronthaul interface; receive the SRS from the O-RU; perform channel estimation of the SRS received from the O-RU; compute a time domain response of the SRS channel estimation on a granularity as defined by a bandwidth of the SRS; determine a timing offset at the defined level of granularity; compensate for the timing offset at the defined level of granularity; estimate beamforming weights according to the compensated timing offset; and transmit the estimated beamforming weights to the O-RU over a fronthaul interface between the O-DU and the O-RU.

In accordance with another embodiment, a non-transitory computer-readable medium having stored thereon instructions for causing processing circuitry to execute a process is provided. The process includes receiving a Sounding Reference Signal (SRS) at an Open Radio Access Network (O-RAN) Distributed Unit (O-DU); performing channel estimation of the SRS received; computing a time domain response of the SRS channel estimation on a level of granularity as defined by a bandwidth of the SRS; determining a timing offset at the defined level of granularity; compensating for the timing offset at the defined level of granularity; estimating beamforming weights according to the compensated timing offset; and transmitting the estimated beamforming weights to an O-RAN Radio Unit (O-RU) over a fronthaul interface between the O-DU and the O-RU.

DETAILED DESCRIPTION

In an O-RAN communication system, the DU computes the beamforming weights for a user based on the SRS channel and these weights are transferred to the radio over the O-RAN interface. The payload of beamforming weights is proportional to the number of TRX and number of RBs allocated for the user. In order to reduce the overhead over the interface, beamformer estimates are transferred per RB as per O-RAN standards. However, any beamformer variation within an RB is not captured in the current setup. As previously discussed, the UE can possess residual timing error even with timing advance (TA) from gNB/eNB due to the granularity of TA command, resulting in frequency selectivity in the UL channel, causing beamforming weights to change within a resource block (RB).

An embodiment of the present disclosure proposes to reduce the channel selectivity so that beamformer granularity does not degrade the beamforming performance. The reduction in channel selectivity is achieved by estimating a timing offset in the SRS channel and correcting the offset.

Figure 1B:
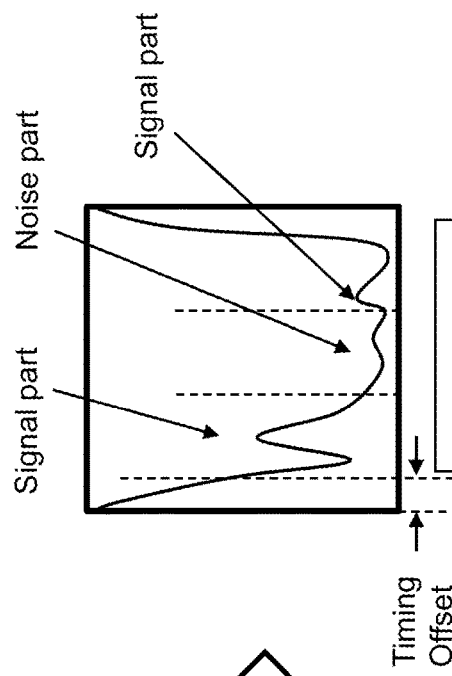
FIGS. 1A and 1B illustrate the respective channel response graphs in the time domain before and after timing offset compensation according to an embodiment.
Figure 2B:
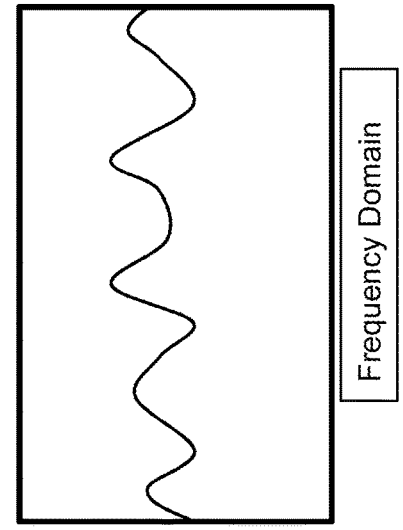
FIGS. 2A and 2B illustrate the respective channel response graphs in the frequency domain before and after frequency selectivity reduction according to an embodiment.
Figure 1A:
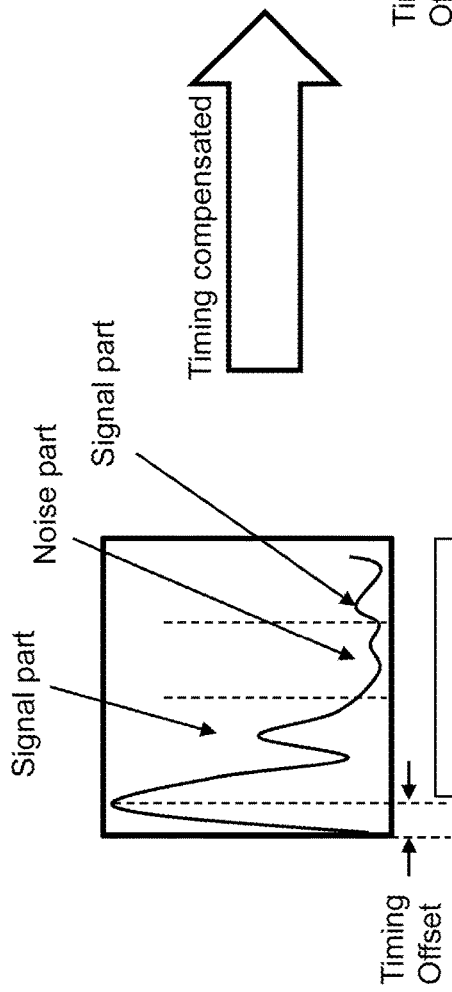
Figure 2A:
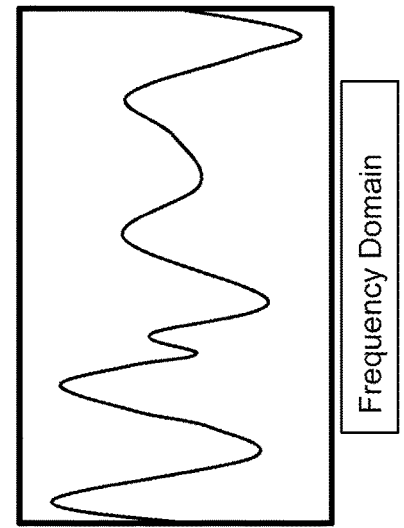

According to one embodiment, when at an Open Radio Access Network (O-RAN) Distributed Unit (O-DU) receives a Sounding Reference Signal (SRS), the O-DU performs channel estimation of the SRS received, and compute a time domain response on the SRS channel estimation at a level of granularity as defined by a bandwidth of the SRS. FIG. 1A shows the channel response graph in the time domain. The graph contains the signal parts and noise parts. A timing offset is determined based on the timing location of a peak relative to a delay equal to zero reference point in the time domain. As can be seen from FIG. 1A, the peak is situated to the right of the delay equal to zero reference point, indicating that the receipt of the SRS is delayed by a timing offset value as indicated. On the other hand, if the peak is situated to the left of the delay equal to zero reference point (not shown), the receipt of the SRS is early by the timing offset value. This timing error results in frequency selectivity in the UL channel. To address this issue, the timing error is compensated by shifting the peak to the left by the determined timing offset value for the case that the SRS is delayed. As shown in FIG. 1B, the peak coincides with the delay equal to zero reference point after compensated for the timing offset. FIG. 2A shows the channel response graph in the frequency domain. It can be seen that the frequency components exhibit large variations due to the timing error. FIG. 2B shows the corresponding channel response graph in the frequency domain after the frequency selectivity reduction via timing offset compensation. It can be seen that the frequency components exhibit smaller variations compare to those shown in FIG. 2A. Since the frequency components have a smaller variation range, the frequency selectivity in the UL channel is reduced. The O-DU then estimates the beamforming weights according to the compensated timing offset, and transmits the estimated beamforming weights to an O-RAN Radio Unit (O-RU) over a fronthaul interface between the O-DU and the O-RU.

With the timing correction in accordance with an embodiment, the performance of the SRS beamformer in O-RAN communication systems is greatly enhanced. It has been observed that in two simulations, respective mean gains of about 8 dB and 8.5 dB can be achieved using the timing offset compensation according to one embodiment.

In a case with highly dispersive channels, even if where there is no residual timing error, i.e., the main peak in the time domain channel response graph is at the delay equal to zero reference point, there will still be multiple similar power level peaks with some large delays. These peaks will also cause the channel to be highly frequency selective. In this case, correcting the timing error based only on the time offset of the main peak may not be sufficient to reduce the frequency selectivity. In one embodiment, a Root Mean Square (RMS) delay spread of the time domain response of the channel is computed on the SRS channel, and the RMS delay spread is compensated accordingly. In one embodiment, a timing offset of the RMS delay spread is determined, and furthermore, the timing offset compensation includes adjusting the RMS delay spread to a reference point of a delay equal to zero.

Note that the SRS processing as defined above can also be done with oversampling or undersampling according to some embodiments. Furthermore, in one embodiment a mixture of both at different stages. For example, oversampling before taking an Inverse Discrete Fourier Transform/Inverse Fast Fourier Transform (IDFT/IFFT) and undersampling after a Discrete Fourier Transform/Fast Fourier Transform (DFT/FFT).

In multi-antenna environment, a single timing compensation is performed for all antennas, according to an embodiment. The single timing estimate can be an average or weighted average of timing estimates from all the antennas or an estimate from channel derived by taking an average or weighted average of SRS channel across all the antennas. In one embodiment, the weighted average is based on a channel condition. For example, the weighted average is based on antenna SNR/SINR.

Figure 3:
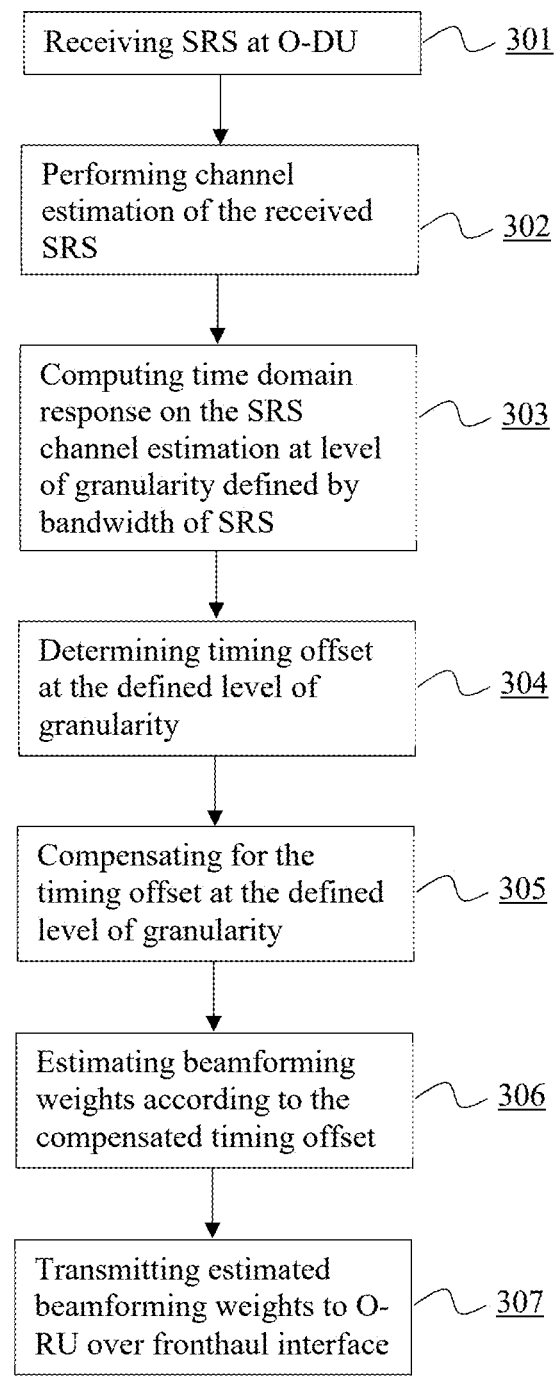
FIG. 3 illustrates a method of estimating beamforming weights according to an embodiment.

As described above, in one general aspect, a method of estimating beamforming weights is provided. Referring to FIG. 3, the method includes receiving a Sounding Reference Signal (SRS) at an Open Radio Access Network (O-RAN) Distributed Unit (O-DU) (301); performing channel estimation of the SRS received (302); computing a time domain response on the SRS channel estimation at a level of granularity as defined by a bandwidth of the SRS (303); determining a timing offset at the defined level of granularity (304); compensating for the timing offset at the defined level of granularity (305); estimating the beamforming weights according to the compensated timing offset (306); and transmitting the estimated beamforming weights to an O-RAN Radio Unit (O-RU) over a fronthaul interface between the O-DU and the O-RU (307).

Implementations of the method may include one or more of the following features. In the method, the SRS is processed with an oversampling or undersampling, or by a mixture of oversampling and undersampling at different stages, according to an embodiment. In the method, compensating for the timing offset includes adjusting a peak of the SRS to a reference point of a delay equal to zero in a time domain, according to an embodiment. In the method, a peak of the SRS in the time domain on a right side of the delay equal to zero indicates a delay in a reception of the SRS and a peak of the SRS in the time domain on a left side of the delay equal to zero indicates an advance in the reception of the SRS, according to an embodiment. Further in the method, the delay in the reception of the SRS is due to a timing delay at a User Equipment (UE), and an advance in the reception of the SRS is due to a timing advance at the UE, according to an embodiment. The method further includes calculating a Root Mean Square (RMS) delay spread of the time domain response of the channel computed on the SRS channel and compensating for the RMS delay spread, according to an embodiment, further includes determining a timing offset of the RMS delay spread, and further includes compensating for the timing offset includes adjusting the RMS delay spread to a reference point of a delay equal to zero. Further, the method is performed on a multi-antenna environment, and the method further compensates a single timing offset for all antennas, and the single timing offset is estimated from all antennas by taking an average of time estimates from all the antennas, according to an embodiment. Further, the method is performed on a multi-antenna environment, and the method further compensates a single timing offset for all antennas, and the single timing offset is estimated from all antennas by estimating from a channel derived by averaging the SRS channels across all the antennas, according to an embodiment.

Figure 4:
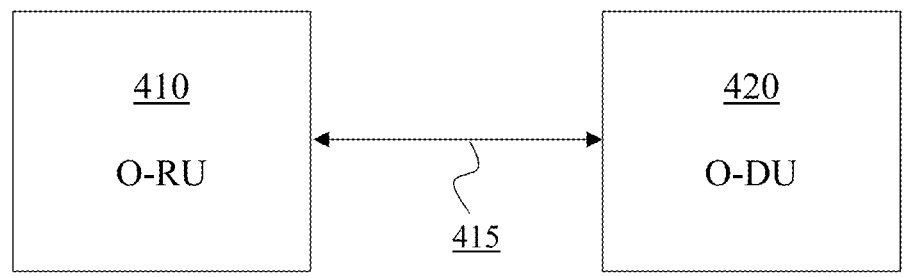
FIG. 4 illustrates an Open Radio Access Network (O-RAN) wireless communication system according to an embodiment.

As described above, in another general aspect, an Open Radio Access Network (O-RAN) wireless communication system is provided. Referring to FIG. 4, the system includes an O-RAN Radio Unit (O-RU) 410 configured to receive a Sounding Reference Signal (SRS); and an O-RAN Distributed Unit (O-DU) 420 configured to: perform bidirectional communication with the O-RU 410 via a fronthaul interface 415; receive the SRS from the O-RU 410; perform channel estimation of the SRS received from the O-RU 410; compute a time domain response of the SRS channel estimation on a granularity as defined by a bandwidth of the SRS; determine a timing offset at the defined level of granularity; compensate for the timing offset at the defined level of granularity; estimate beamforming weights according to the compensated timing offset; and transmit the estimated beamforming weights to the O-RU 410 over a fronthaul interface 415 between the O-DU 420 and the O-RU 410.

Implementations of the Open Radio Access Network (O-RAN) wireless communication system may include one or more of the following features. In the system, the SRS is processed with an oversampling or undersampling, or by a mixture of oversampling and undersampling at different stages, according to an embodiment. In the system, the O-DU is further configured to compensate for the timing offset by adjusting a peak of a time domain response of the SRS channel to a reference point of a delay equal to zero in the time domain, according to an embodiment. In a further embodiment, the peak of the SRS in the time domain on a right side of the delay equal to zero indicates a delay in a reception of the SRS and the peak of the SRS in the time domain on a left side of the delay equal to zero indicates an advance in the reception of the SRS, according to an embodiment. In a further embodiment, the delay in the reception of the SRS is due to a timing delay at a User Equipment (UE), and an advance in the reception of the SRS is due to a timing advance at the UE, according to an embodiment. In the system, the O-DU is further configured to: calculate a Root Mean Square (RMS) delay spread of the SRS channel; and compute a time domain response of the RMS delay spread of the SRS channel, according to an embodiment. In a further embodiment, the O-DU is configured to determine a timing offset of the RMS delay spread, and further, the O-DU is configured to compensate for the timing offset by adjusting the RMS delay spread to a delay equal zero. In a multi-antenna environment, and the O-DU is further configured to compensate a single timing offset for all antennas, and the single timing offset is estimated from all antennas by taking an average of time estimates from all the antennas, according to an embodiment. In a multi-antenna environment, and the O-DU is further configured to compensate a single timing offset for all antennas, and the single timing offset is estimated from all antennas by estimating from a channel derived by averaging the SRS channels across all the antennas, according to an embodiment.

As described above, in another general aspect, a non-transitory computer-readable medium having stored thereon instructions for causing processing circuitry to execute a process is provided. The process includes receiving a Sounding Reference Signal (SRS) at an Open Radio Access Network (O-RAN) Distributed Unit (O-DU); performing channel estimation of the SRS received; computing a time domain response of the SRS channel estimation on a level of granularity as defined by a bandwidth of the SRS; determining a timing offset at the defined level of granularity; compensating for the timing offset at the defined level of granularity; estimating beamforming weights according to the compensated timing offset; and transmitting the estimated beamforming weights to an O-RAN Radio Unit (O-RU) over a fronthaul interface between the O-DU and the O-RU.

Other variations to the disclosed embodiments can be understood and effected by those skilled in the art in practicing the claimed features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like acquiring, accessing, analyzing, capturing, comparing, determining, displaying, inputting, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method of estimating beamforming weights, the method comprising:
  receiving a Sounding Reference Signal (SRS) at an Open Radio Access Network (O-RAN) Distributed Unit (O-DU);
  performing channel estimation of the SRS received;

computing a time domain response on the SRS channel estimation at a level of granularity as defined by a bandwidth of the SRS;

determining a timing offset at the defined level of granularity;

compensating for the timing offset at the defined level of granularity;

estimating the beamforming weights according to the compensated timing offset; and transmitting the estimated beamforming weights to an O-RAN Radio Unit (O-RU) over a fronthaul interface between the O-DU and the O-RU.

2. The method according to claim 1, wherein the SRS is processed with an oversampling or undersampling, or by a mixture of oversampling and undersampling at different stages.

3. The method according to claim 1, wherein compensating for the timing offset includes adjusting a peak of the SRS to a reference point of a delay equal to zero in a time domain.

4. The method according to claim 3, wherein a peak of the SRS in the time domain on a right side of the delay equal to zero indicates a delay in a reception of the SRS and a peak of the SRS in the time domain on a left side of the delay equal to zero indicates an advance in the reception of the SRS.

5. The method according to claim 1, further comprising calculating a Root Mean Square (RMS) delay spread of the time domain response of the channel computed on the SRS channel and compensating for the RMS delay spread.

6. The method according to claim 5, further comprising determining a timing offset of the RMS delay spread, wherein compensating for the timing offset includes adjusting the RMS delay spread to a reference point of a delay equal to zero.

7. The method according to claim 1, wherein the method is performed on a multi-antenna environment, and the method further compensates a single timing offset for all antennas, and the single timing offset is estimated from all antennas by taking an average or weighted average of time estimates from all the antennas.

8. The method according to claim 1, wherein the method is performed on a multi-antenna environment, and the method further compensates a single timing offset for all antennas, and the single timing offset is estimated from all antennas by estimating from a channel derived by taking an average or weighted average of the SRS channels across all the antennas.

9. An Open Radio Access Network (O-RAN) wireless communication system comprising:

an O-RAN Radio Unit (O-RU) configured to receive a Sounding Reference Signal (SRS); and an O-RAN Distributed Unit (O-DU) configured to:
 perform bidirectional communication with the O-RU via a fronthaul interface between the O-DU and the O-RU;
 receive the SRS from the O-RU;
 perform channel estimation of the SRS received from the O-RU;
 compute a time domain response of the SRS channel estimation on a granularity as defined by a bandwidth of the SRS;
 determine a timing offset at the defined level of granularity;
 compensate for the timing offset at the defined level of granularity;
 estimate beamforming weights according to the compensated timing offset; and
 transmit the estimated beamforming weights to the O-RU over the fronthaul interface between the O-DU and the O-RU.

10. The wireless communication system according to claim 9, wherein the SRS is processed with an oversampling or undersampling, or by a mixture of oversampling and undersampling at different stages.

11. The wireless communication system according to claim 9, wherein the O-DU is configured to compensate for the timing offset by adjusting a peak of a time domain response of the SRS channel to a reference point of a delay equal to zero in the time domain.

12. The wireless communication system according to claim 11, wherein the peak of the SRS in the time domain on a right side of the delay equal to zero indicates a delay in a reception of the SRS and the peak of the SRS in the time domain on a left side of the delay equal to zero indicates an advance in the reception of the SRS.

13. The wireless communication system according to claim 9, wherein the O-DU is configured to:
 calculate a Root Mean Square (RMS) delay spread of the SRS channel; and
 compute a time domain response of the RMS delay spread of the SRS channel.

14. The wireless communication system according to claim 13, wherein the O-DU is configured to determine a timing offset of the RMS delay spread, and to compensate for the timing offset by adjusting the RMS delay spread to a delay equal zero.

15. The wireless communication system according to claim 9, wherein the wireless communication system operates in a multi-antenna environment, and the O-DU is further configured to compensate a single timing offset for all antennas, and the single timing offset is estimated from all antennas by taking an average of time estimates from all the antennas.

16. The wireless communication system according to claim 9, wherein the wireless communication system operates in a multi-antenna environment, and the O-DU is further configured to compensate a single timing offset for all antennas, and the single timing offset is estimated from all antennas by estimating from a channel derived by averaging the SRS channels across all the antennas.

17. A non-transitory computer-readable medium having stored thereon instructions for causing processing circuitry to execute a process, the process comprising:
 receiving a Sounding Reference Signal (SRS) at an Open Radio Access Network (O-RAN) Distributed Unit (O-DU);
 performing channel estimation of the SRS received;
 computing a time domain response of the SRS channel estimation on a level of granularity as defined by a bandwidth of the SRS;
 determining a timing offset at the defined level of granularity;
 compensating for the timing offset at the defined level of granularity;
 estimating beamforming weights according to the compensated timing offset; and
 transmitting the estimated beamforming weights to an O-RAN Radio Unit (O-RU) over a fronthaul interface between the O-DU and the O-RU.

18. The non-transitory computer-readable medium according to claim 17, wherein the SRS is processed with an oversampling or undersampling, or by a mixture of oversampling and undersampling at different stages.

\* \* \* \* \*